May 26, 1953  D. E. MARSHALL  2,640,033
PROCESS AND APPARATUS FOR CONTINUOUSLY PROCESSING
AND EXTRUDING PLASTICIZING MATERIALS
Filed Dec. 13, 1947  6 Sheets-Sheet 5
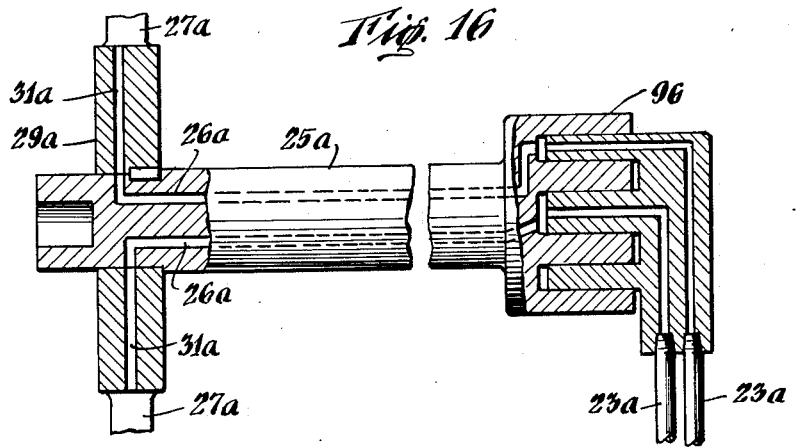
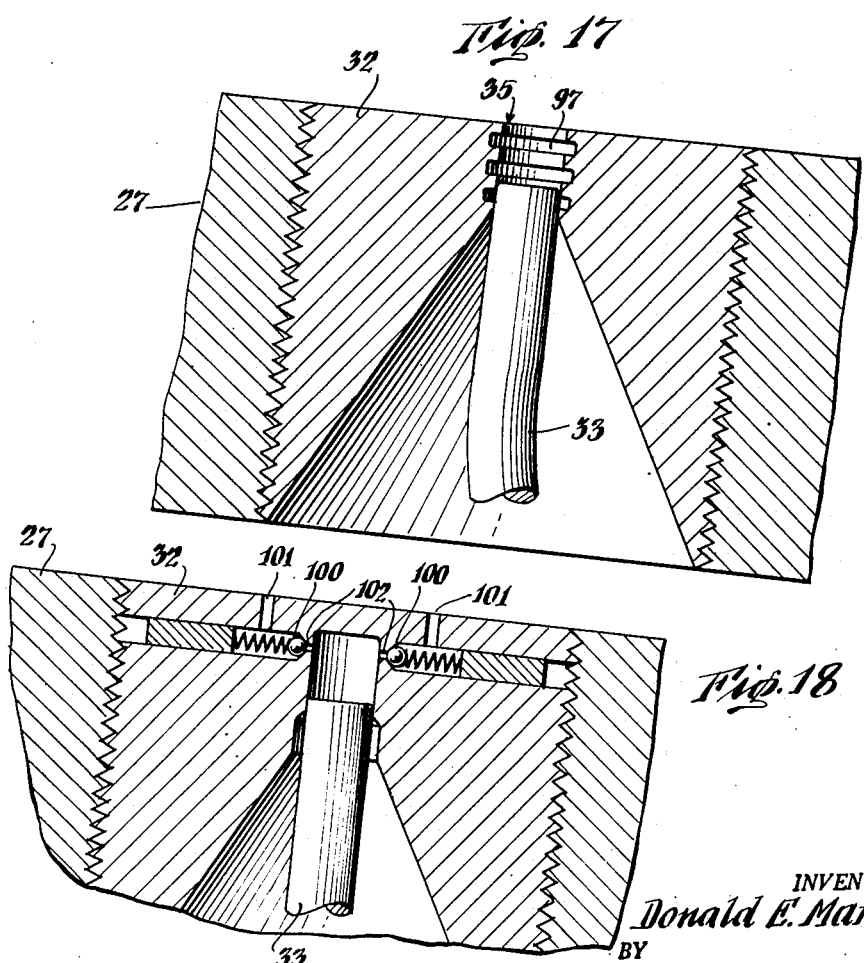
INVENTOR.
Donald E. Marshall
BY
Burgess Ryan & Hicks
ATTORNEY May 26, 1953   D. E. MARSHALL   2,640,033
PROCESS AND APPARATUS FOR CONTINUOUSLY PROCESSING
AND EXTRUDING PLASTICIZING MATERIALS
Filed Dec. 13, 1947   6 Sheets-Sheet 6

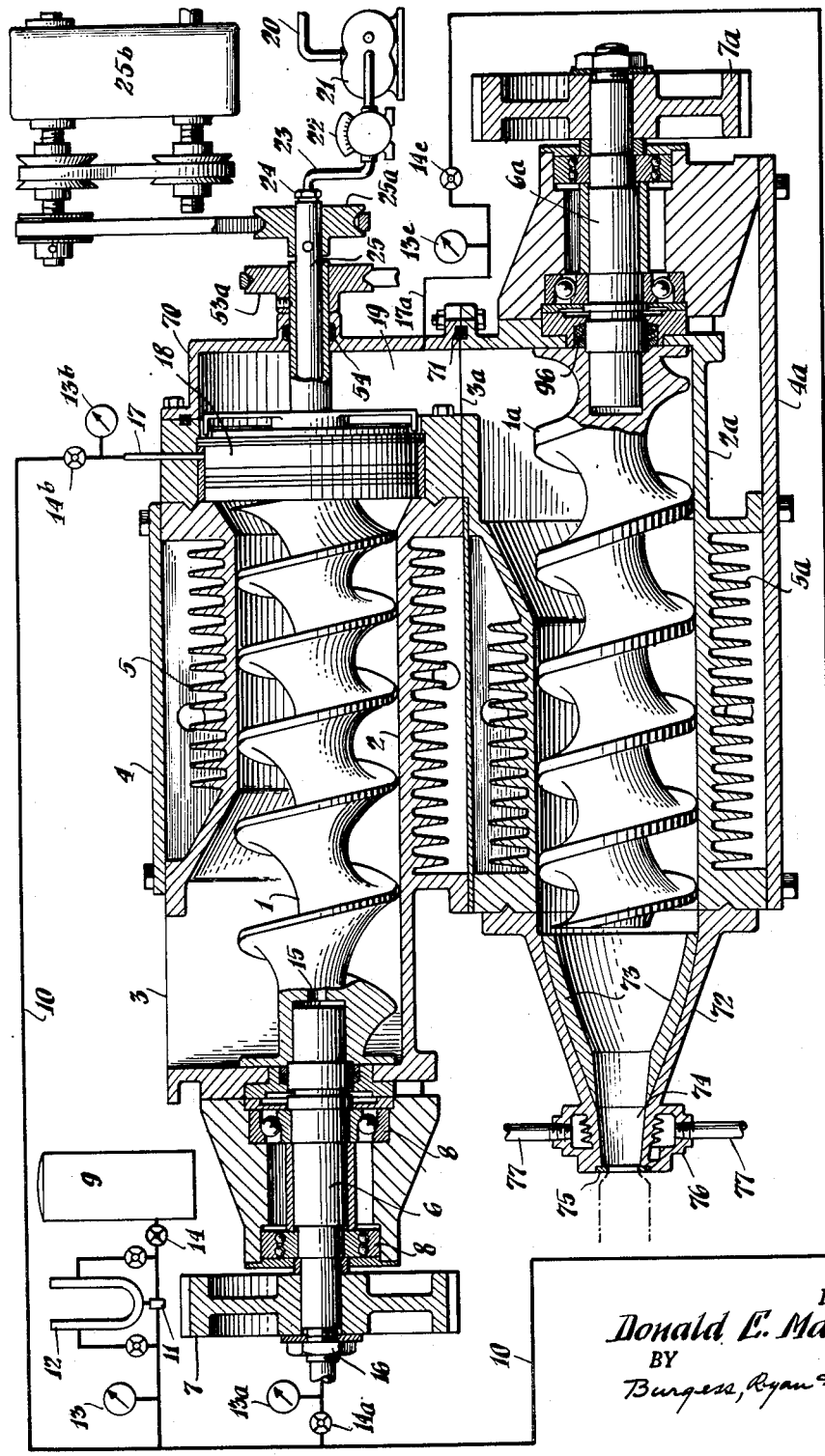

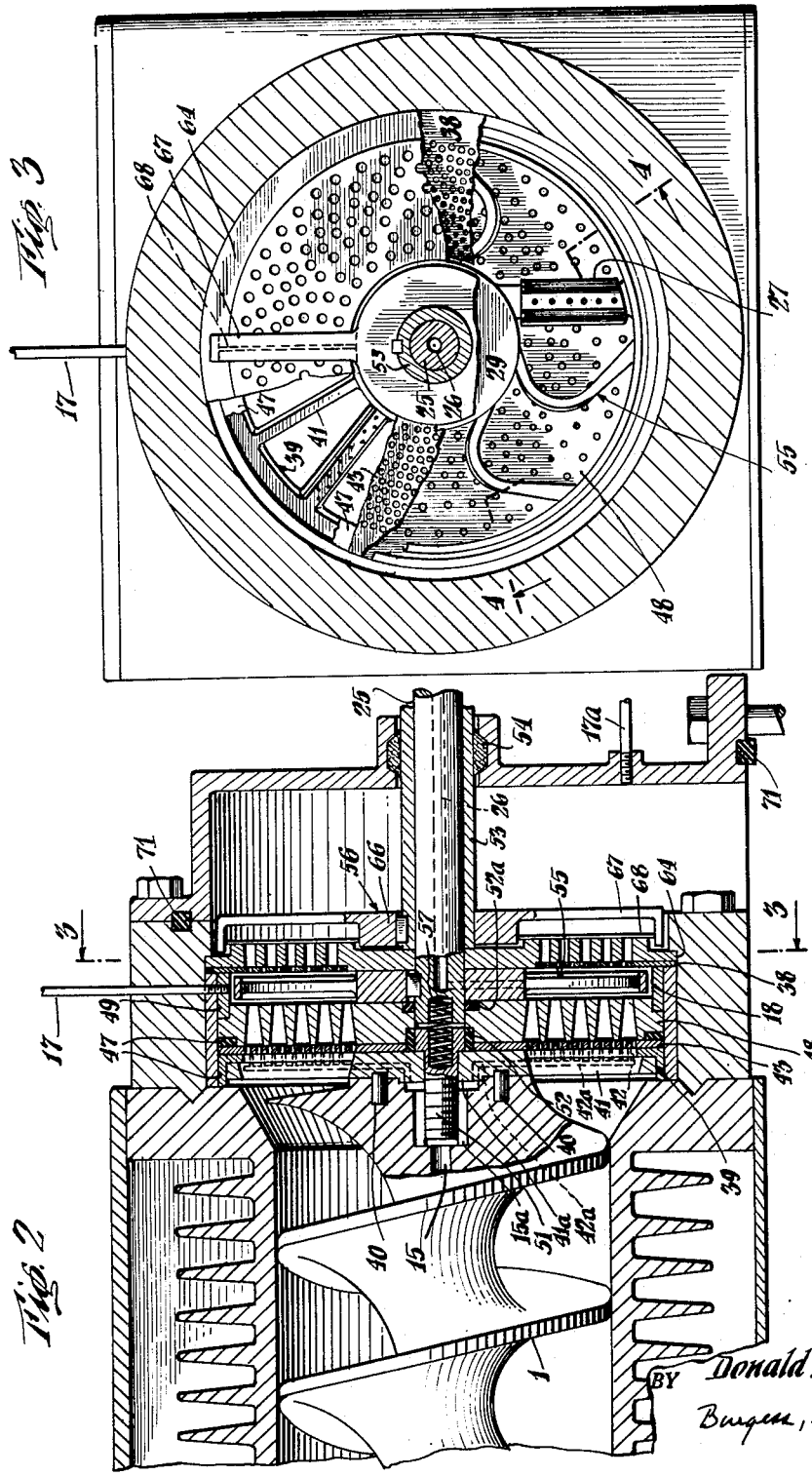

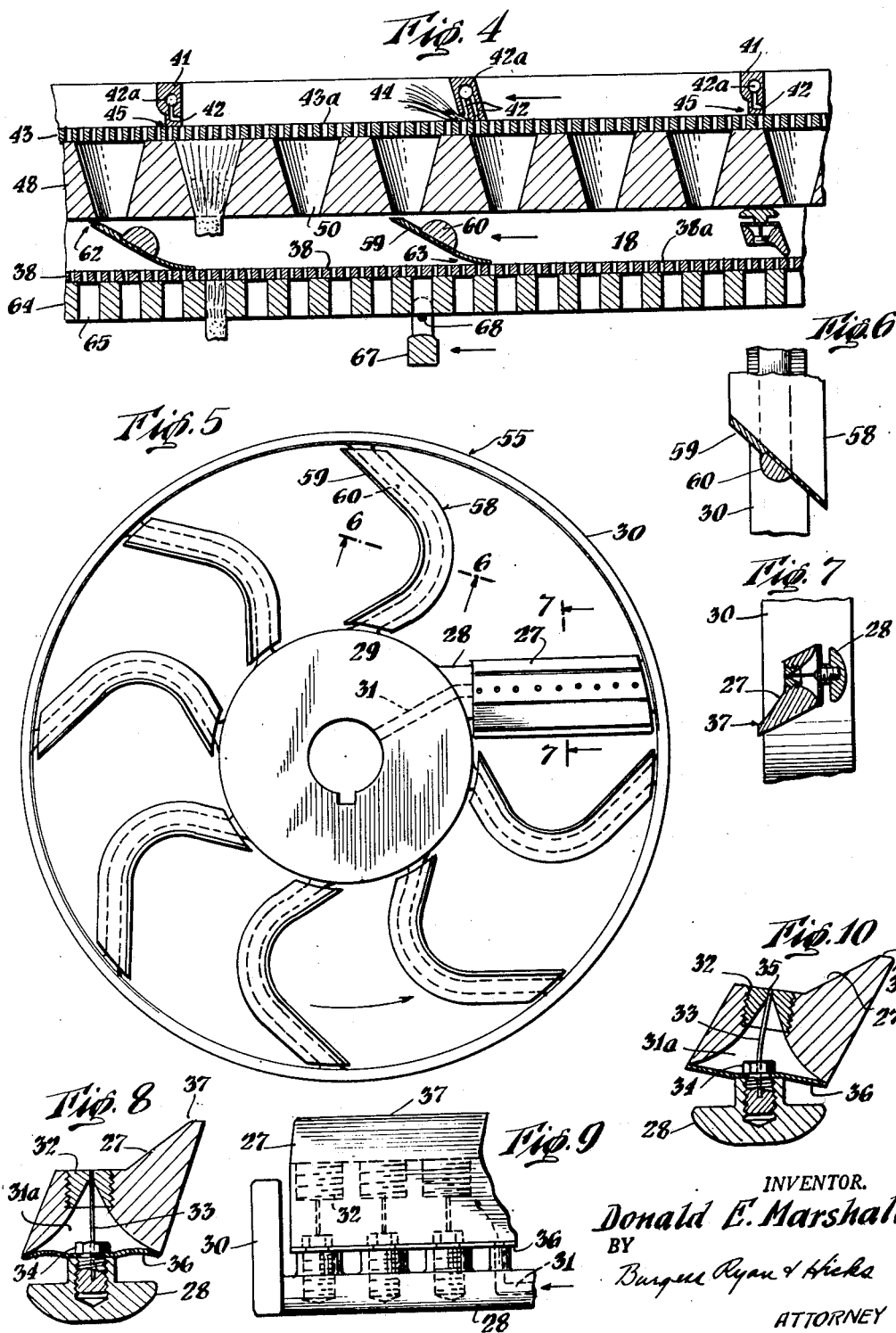

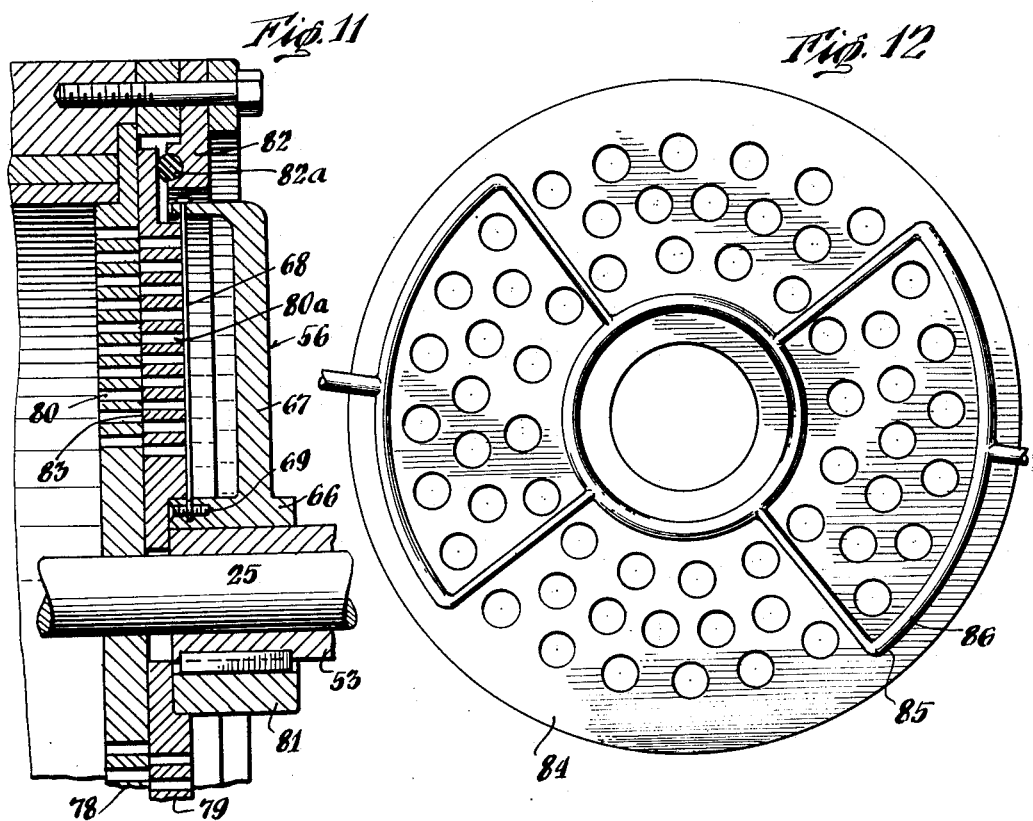
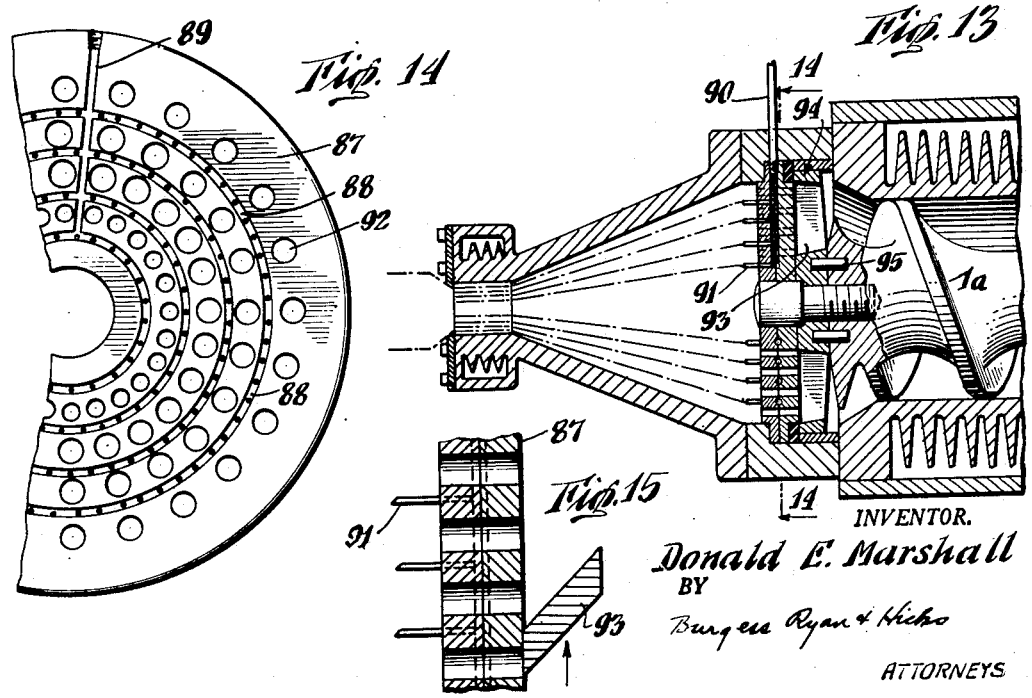

INVENTOR.
Donald E. Marshall
BY
Burgess, Ryan & Hicks
ATTORNEYS

Patented May 26, 1953

2,640,033

UNITED STATES PATENT OFFICE 2,640,033

PROCESS AND APPARATUS FOR CONTINUOUSLY PROCESSING AND EXTRUDING PLASTICIZING MATERIALS

Donald E. Marshall, Summit, N. J., assignor to Micro Processing Equipment, Inc., Des Plaines, Ill., a corporation of Illinois Application December 13, 1947, Serial No. 791,610

26 Claims. (Cl. 252—367)

This invention relates to a process and apparatus for continuously processing and extruding a plasticizable material and the product resulting therefrom.

An object of the invention is to provide an apparatus and process for combining additional ingredients with the plasticizable material in finely divided and uniformly distributed form. Another object of the invention is to provide an apparatus and process for obtaining special effects or cellular structures in the material that is being processed either with or without the combining of additional ingredients therewith. In accordance with the present invention, the combining of additional ingredients with the material being processed or the obtaining of special effects or cellular structure therein is accomplished without the beating, mixing or working of the plasticizable material as a mass. This avoids the deleterious effects that may occur from or accompany such beating or mixing of the material as for example a rise in the temperature of the material which will cause a reversion or change in the properties of the material being processed that have been obtained by special preparation, such as the micro-crystalline structure of milled soap or the ultra-micro-crystalline structure of transparent soap. Such characteristics of milled soaps have been previously described in my copending application, Serial No. 591,553, filed May 2, 1945, now Patent No. 2,494,891, issued January 17, 1950. The present invention provides for the processing of such materials under conditions where the temperature of the material being processed is not such as to cause any material change in the properties of the material that have been obtained by special preparation.

A further object of the invention is to provide a process and apparatus for the continuous processing of plasticized colloidal suspensions, such as soaps, candies, doughs, pastries and the like by an extrusion technique which will not separate semi-solid, liquid or gas phase material from the plasticized solids so as to cause streaks or other non-uniformity in the end product because of the localized mechanical pressures of extrusion. The invention further provides for the precise control, both quantitatively and structurally, of the materials being processed and from which soap, candy, dough or the like is to be produced in order that the qualities of the product to be made from the processed material will be as desired.

The various purposes as set forth above and numerous other purposes and advantages of the invention will be best understood from the following description and the accompanying drawings in which:

Fig. 1 is a side view in partial section of an apparatus embodying the invention with certain parts being shown diagrammatically;

Fig. 2 is a section view of a portion of the apparatus illustrated in Fig. 1 on an enlarged scale;

Fig. 3 is a section view taken along the line 3—3 of Fig. 2 with portions broken away to show certain details of the apparatus;

Fig. 4 is a linear layout in section along the line 4—4 of Fig. 3;

Fig. 5 is a plan view illustrating a cutting-spreading and feed head forming part of the apparatus illustrated in Fig. 2;

Fig. 6 is a section view taken along the line 6—6 of Fig. 5;

Fig. 7 is a section view taken along the line 7—7 of Fig. 5;

Fig. 8 is a section view on an enlarged scale of a feed blade for the cutting-spreading and feed head with the blade being shown in unflexed position;

Fig. 9 is a side view of a portion of the secondary feed blade illustrated in Fig. 8;

Fig. 10 is a section view corresponding to Fig. 8 but with the feed blade being shown in flexed position;

Fig. 11 is a section view of a modified pressure plate for use in the apparatus illustrated in Fig. 2;

Fig. 12 is a plan view of another modified form of a pressure plate for use in the apparatus illustrated in Fig. 2;

Fig. 13 is a section view showing a modified arrangement for the discharge end of the apparatus illustrated in Fig. 1;

Fig. 14 is a plan view of a split plate as viewed along the line 14—14 of Fig. 13;

Fig. 15 is a section view represented linearly of a portion of the apparatus illustrated in Fig. 13;

Fig. 16 is a view in partial section of a modified arrangement for supplying a secondary material to the cutting-spreading and feed head;

Fig. 17 is a section view illustrating a modified arrangement of a metering orifice for the feed blade illustrated in Fig. 8;

Fig. 18 is a section view illustrating another modification of a metering orifice for the feed blade illustrated in Fig. 8;

Figure 19:
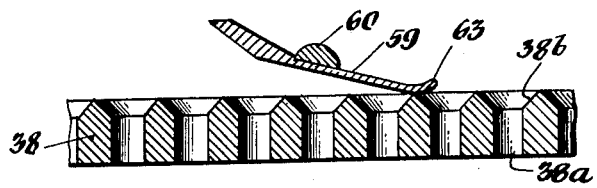
Figs. 19 and 20 are a section view and plan view of a modified spreading plate.

Referring to the drawings in detail, there is an extrusion worm 1 revolvably mounted in a barrel 2 of a plodding machine. A plasticizable primary material is introduced onto the worm 1 through a feed opening 3 in the plodder barrel. The barrel 2 may be enclosed by a cooling jacket 4 that is provided with suitable inlet and outlet ports for circulating a cooling medium therein so that heat developed by friction on the barrel surfaces may be dissipated and the temperature of the material controlled thereby. Cooling fins 5 may also be provided on the barrel 2. The worm 1 is connected to a shaft 6 that carries a gear 7. The shaft 6 is supported by a bearing 8 in the end of the plodder and may be driven by a suitable driving mechanism through the gear 7.

As shown in Fig. 1, compressed gas is delivered to the certain portions of the plodder in pressure regulated and controlled amounts from a compressed gas supply 9 through supply lines 10. The gas is delivered to the supply lines through a calibrated orifice 11 and the pressure and amount of gas supplied may be regulated by observing manometer 12 and pressure gauge 13 and adjusting valve 14.

A longitudinal central channel 15 extending through the shaft 6 and the worm 1 is connected to one of the gas supply lines 10 through a rotating sealing gland 16, a pressure gauge 13a and a valve 14a. An inlet tube 17 connects an intermediate chamber 18 of the plodder to one of the gas supply lines 10 through a pressure gauge 13b and a valve 14b. And a chamber 19 at the end of the first stage of the plodder is connected to one of the gas supply lines 10 through a pressure gauge 13c and a valve 14c and an inlet tube 17a. Thus, the gas delivered to the various parts of the plodder may be regulated as desired by adjustment of the apparatus valves.

A supply of secondary material or ingredient, such as gases, liquids or plasticizable pumpable material that is to be combined or blended with the primary material may be supplied through a supply line 20 to a positive pressure metering pump 21. The output of the pump 21 is connected through a pressure and flow recording meter 22 and a supply line 23 to a rotating sealing gland 24 located at the end of a shaft 25. As shown in Fig. 2, the shaft 25 extends into the plodder and has a channel 26 therein that communicates with the supply line 23 through the sealing gland 24.

A feed blade 27 for distributing the secondary material is supported by a spoke 28. The spoke 28 is supported between a hub 29 that is keyed to the shaft 25 and a rim 30 that is spaced from the hub. A passageway 31 extending through the hub 29 and the spoke 28 connects the channel 26 in the shaft 25 to a manifold passage 31a in the feed blade 27 as shown in Figs. 5, 8 and 9. A series of metering orifice plugs 32 that communicate with the passage 31a are replaceably mounted along a recessed or offset face of the feed blade 27. A corresponding series of metering pins 33 are mounted on a series of bosses 34 on the spoke 28 and extend into the orifices in the plugs 32. The metering pins 33 may be fitted rather closely in the orifices so as to permit only the desired flow of material from the orifices and to prevent clogging or fouling of the orifices.

As shown best in Figs. 8 and 10, a flexible diaphragm 36 forming the back of the feed blade is secured to the bosses 34 on the spoke 28. The mounting of the feed blade in this manner permits the blade to flex as its spreading edge 37 moves over a spreading surface of a foraminous spreading plate 38. The flexing of the feed blade causes the metering pins 33 to move in and out relative to the metering orifices as shown in Figs. 8 and 10. This relative movement between the metering pins and the orifices provides a non-clogging, feeding arrangement that may be accurately calibrated for the positive feeding of materials of widely varying states, under pressure and at minute rates of flow such as may be supplied by the metering pump 21.

The metering pins 33 are removably supported in the bosses 34 on the spoke 28 and they may be replaced by the removal of the orifice fittings or plugs 32 so that both the pins 33 and the orifices 32 may be changed to provide a calibrated feed at the pressure and flow desired. Fig. 10 illustrates the action of metering pin 33 that may be obtained by the variations in resistance to the spreading edge 37 of the feed blade 27 as it moves over the spreading plate 38, causing the diaphragm 36 to flex. The flexing of the feed blade may be positively actuated if desired by embossing cam-like buttons on the face of the plate 38 in the path of the feed blade's travel on plate 38 and in this manner a definite number of flexing actions per revolution may be obtained. It should also be noted that the feed channel 31 of the blade 27, as shown in Fig. 9, is made large enough to insure a non-clogging flow of material to the manifold passage 31a from the channel 26 in the shaft 25.

As shown best in Fig. 2, there is a comminuting head 39 that is connected to the end of the worm 1 by pins 40 and revolves with the worm. The comminuting head 39 consists of a series of blades 41 extending radially from a hub 41a. Each of the blades 41 has a series of outlet orifices 42 that are connected by passageways 42a in the blades and the hub to openings 15a in the end of the worm that communicates with the central channel 15 in the worm.

As shown in Fig. 4, the blades 41 press against a foraminous screen or plate 43 and scrape against the plate as they are rotated. Some of the blades 41 are of such a character that they cut the material being fed forward by the worm. As indicated at 44 alternate blades 41 of the comminuting head are inclined with regard to the surface of the plate 43 and press the material being processed against the plate. The other blades of the comminuting head are at right angles to the plate 43 as indicated at 45 and these blades scrape the surface of the plate and keep it clean. The inclined blades also serve to entrap in the material being processed particles of the gas that is being supplied through the orifices 42 in the blades 41 and, to assist in this function, the inclined blades may be provided with dual orifices 42 in their faces as shown in Fig. 4. The compacting action of the worm as it feeds the primary material forward and the pressure of the compacted material against the sides of the barrel of the plodder form an effective seal against the counterflow or escape of the gas supplied through the comminuting blades 41.

The foraminous plate 43 is relatively thin and has numerous small perforations 43ª extending through it. The plate 43 is held in place in close proximity to the comminuting head 39 by clamping rings 47 and is supported or backed by a pressure plate 48 that is held in place by a clamping ring 49. The pressure plate 48 has converging openings 50 that extend transversely through it and tend to collect and compact the strands of material emerging from the openings in the foraminous plate 43 and passing through it.

A stud shaft 51 is threaded into the end of the worm 1. The shaft 51 extends through the comminuting head 39 and the foraminous plate 43 into the pressure plate 48 where it is supported in a bearing 52. The shaft 25, previously mentioned, extends into the pressure plate 48 in opposed relation to the shaft 51 and is journalled in a bearing 52ª in the pressure plate 48. Surrounding the shaft 25 there is a rotating sleeve 53 that is mounted in a sealed bearing 54 at the end of the plodder. As shown in Fig. 1, the shaft 25 carries a pulley 25ª and may be driven from a suitable source of power through a variable speed controller 25ᵇ. The sleeve 53 carries a pulley 53ª and may be driven through a variable speed controller or by a direct drive.

As shown in Fig. 2, a cutting-spreading and feed head 55, illustrated in detail in Fig. 5, is keyed to the shaft 25 and a cut-off head 56 is keyed to the rotating sleeve 53. A compression spring 57 located between the opposed ends of the shafts 25 and 51 urges the shaft 25 outwardly and forces the cutting-spreading head 55 into contact with the foraminous spreading plate 38, previously mentioned. As shown in Fig. 5, the cutting-spreading and feed head 55 includes the feed blade 27, previously described, and it also has a series of curved blades 58 that cut the material being processed as it emerges from the openings 50 in the pressure plate 48 and spread the material so cut on the spreading surface of the plate 38 as shown in Fig. 4.

The blades 58 of the cutting head 55 each consist of a spring blade 59, as shown in Figs. 4 and 6, that is mounted on a curved spoke or arm 60 which extends between the hub 29 and the rim 30 which also supports the feed blade 27. As shown in Fig. 4 the spring blades 59 are pitched so that their cutting edges 62 engage with the material being processed as it emerges from the openings 50 in the pressure plate 48 and their spreading edges 63 wipe the cut material across the face of the spreading plate 38 and tend to force the material through the openings in the plate 38. The curve in the blades 58 serves to move the material both from the outer circumference and from the hub toward a mean area on plate 38. This prevents fouling of blades and prevents jamming of the chamber 18.

The spring blades 59 are mounted between the back-up plate 48 and the spreading plate 38 so that their cutting edges are close to the back-up plate 48 and their spreading edges press against the spreading plate 38. By this arrangement, the foraminous plate 43 and the back-up plate 48 withhold the mass of the material being extruded by the worm 1 from the mixing and blending chamber 18 in which the cutting-spreading and feed head operates and the flow of material through the plate 43 is regulated in accordance with the passage of the material through the chamber 18 so that the cutting and spreading blades may work freely in the chamber without appreciably raising the temperature of material they are acting on. The material in the openings 50 also seals the chamber 18 against the counterflow of gases from that chamber.

The feed blade 27 through which a secondary material may be supplied is positioned between two of the spreading blades. The spreading surface of the feed blade also presses against the surface of the spreading plate and spreads the secondary material so that it will be combined and blended with the primary material in finely divided and evenly distributed form.

The foraminous spreading plate 38 is relatively thin and has numerous small openings 38ª extending through it. The size and shape of the openings 38ª and the contour of spreading surface of the plate 38 will depend upon the characteristics of the primary material being processed and may be varied to obtain the blending, fineness of aeration and cellular structure desired in the end product.

In processing a material such as dough, when it is desired to stratify solidified shortening or other ingredient with the dough, the openings 38ª in the plate 38 may be arranged to present a minimum of area or dead space therebetween with the openings being relatively large to minimize the blending action. On the other hand in processing an aerated milled soap where the blending of the particles of gas throughout the material within the limits of heat dissipation is sought, greater surface areas between openings 38ª is desirable with openings 38ª being relatively small and circular in shape. The cellular structure of the material will be particularly affected by the size and shape of the openings 38ª in cases where material is not subjected to high compression in the subsequent stages of the process.

Figure 20:
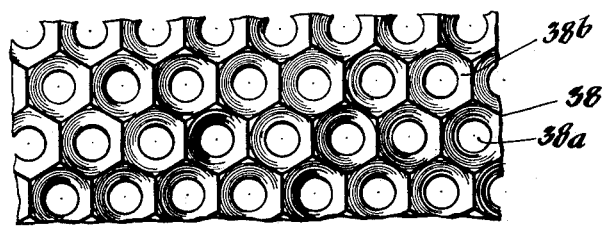
Figure 21:
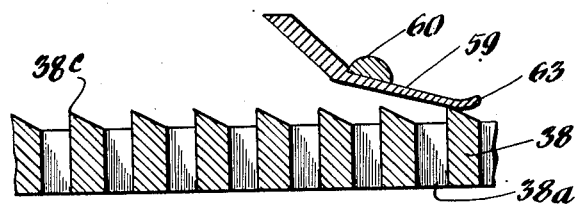
Figs. 21 and 22 are section views of modified forms of spreading plates.
Figure 22:
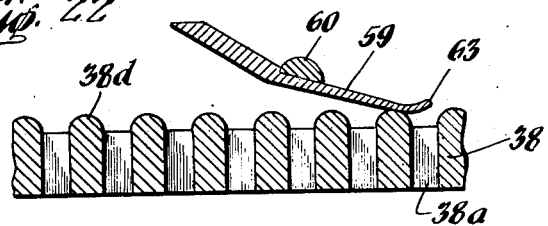

The contour of the spreading surface of the plate 38 will depend primarily upon the ease with which the primary material may be spread or wiped over the surface of the plate. With the more spreadable materials such as a transparent soap stock, the openings 38ª may extend straight through the plate as such materials are not affected by the surface areas between the openings. However, with materials that do not spread so readily and have a tendency to ball, such as low-moisture, milled soap stock, the surface area of the plate 38 that is in contact with the spreading blades may be reduced by countersinking the openings 38ª as indicated at 38ᵇ in Figs. 19 and 20. Also, ridges as indicated at 38ᶜ and 38ᵈ may be provided on the surface of the plate 38, as illustrated in Figs. 21 and 22 so that the spring action of the blades 58 as they pass over the ridges will serve to force the material forward through the openings.

The openings in the plate 38 may be round, rectangular, radial or other desired shape depending upon the cellular structure that is to be obtained. The size of the openings in the plate 38 is also governed by the cellular structure it is desired to obtain; i. e., the smaller the opening the finer the cellular structure is that will be obtained with a given material for a given speed of the spreading blades and pressure in the chamber.

As previously mentioned, the chamber 18 is connected through inlet tube 17 and gas lines 10 to the gas supply 9 and thus, the pressure in the chamber 18 may be regulated as desired. When gas under pressure is supplied to the chamber 18 it will assist the spreading blades 58 in forcing the material through the openings in the plate 38.

The foraminous plate 38 is backed by a pressure plate 64 that has non-converging openings 65 through it. However, if the size of the openings in plate 38 are large, a single plate may be used in place of the plates 38 and 64.

As shown in Fig. 2, the cutting head 56 is mounted immediately behind the discharge side of the pressure plate 64. It may be mounted immediately behind the plate 38 when a single plate is used. A hub 66 of the cutting-head 56 is keyed to the rotating sleeve 53 and has an arm or arms 67 extending therefrom. Each of the arms 67 carries a cutting wire 68 that is secured to the hub 66 by a suitable fastening means 69 as shown in Fig. 11. The arms 67 hold the cutting wires 68 in close alignment with the discharge ends of the openings in the plate 64 so that as the material emerges from the openings in the plate 64 it is cut cleanly into pellets. By regulating the speed of the cutting head relative to the speed of the cutting-spreading and feed head 55, the size of the pellets may be controlled as desired for further treatment of the material.

The cutting head 56 may not be required where the material crumbles readily and breaks off of its own accord as it emerges through the openings 65 in the plate 64. The processing of the material just described may, if desired, be repeated or the material may be reformed and discharged.

An end piece 70 of the plodder is removable and is provided with seals 71 so that the chamber 19 at the end of the plodder will be air tight. The end piece 70 also supports the air tight bearing 54 for the rotating sleeve 53. The end piece is removable to permit ready access to the mechanism just described in order that adjustments or replacements may be made readily.

As shown in Fig. 1, the second stage of the plodder is generally similar to the first stage of the plodder and need not be described in detail here. An extrusion worm 1$^a$ is rotatably mounted in a barrel 2$^a$ and is driven in a suitable manner through shaft 6$^a$ and a gear 7$^a$. The barrel 2$^a$ may be provided with fins 5$^a$ and enclosed in a jacket 4$^a$ through which a cooling or heating medium may be circulated. As the pellets of the material being processed are cut by the cutting head 56, they pass through the pressurized chamber 19 and are allowed to fall by gravity through a feed opening 3$^a$ of a second stage of the plodder onto the worm 1$^a$. The worm 1$^a$ progressively compacts the pellets and carries them forward to the discharge end of the plodder. The pitch of the worm 1$^a$ and the speed at which the worm 1$^a$ is driven and also the gas pressure applied to chamber 19 may be regulated so that the pellets are compacted into a smooth, homogeneous mass that is free of undesirable striations or separated material.

As the worm 1$^a$ rotates it carries the material being treated forward and forces it through the discharge end of the plodder. This discharge end of the plodder is of the usual construction and consists of a converging barrel section 72 in which there are flow guides 73 to prevent churning and at the end of the barrel section 73 there is a nozzle 74. A sizing orifice plate 75 is mounted at the end of the nozzle 74 and the nozzle is provided with a jacket 76 through which a suitable heating or cooling medium is circulated by pipes 77.

A modified form of a spreader plate may be used, if desired, in place of the foraminous plate 38 and the pressure plate 64 as shown in Fig. 11. This plate is split in two sections 78 and 79 with openings 80 and 80$^a$ that extend through each section, respectively. A central opening in the section 79 engages with a cam 81 that may also serve as the hub of the cut-off 56 and is secured to the rotating sleeve 53. The outer circumference of the section 79 is supported by a ball bracket ring 82 and balls 82$^a$ that take the thrust and permit an edgewise movement of the section 79 under the influence of the cam 81.

The sections 78 and 79 of the plate and the cam 81 are so designed that the edgewise movement of the section 79 causes the openings 80 in the fixed section 78 to be alternately blocked by the walls 83 between the openings 80$^a$ in the movable section 79 (as shown in Fig. 11) opened by alignment with the openings 80$^a$ during each revolution of the sleeve 53. This causes the material that is in the openings 80 in the fixed section 78 when they are blocked to be compacted momentarily before the material is permitted to pass through the pressure plate. Also, it serves more effectively to seal the pressures in chamber 18 from the pressures in chamber 19 when material is compacting tightly in the openings 80. A plate of this type may also be used in place of the plate 48 if desired.

Another modified form of a pressure plate is illustrated in Fig. 12. This plate 84 is split and has grooves 85 in which tubes 86 may be placed. A suitable cooling or heating medium may be circulated through the tubes 86 to maintain a desired temperature through the cross-section of the material being processed. Such a plate may be used if desired in place of either the plate 48 or the plate 64.

Figs. 13, 14 and 15 illustrate a modified arrangement for the discharge end of the worm of the second stage of the plodder designed to develop a honeycombed structure in the extruded material. This modified arrangement comprises a plate 87 located at the end of the worm 1$^a$ and which may be made in two halves. Each half has a series of concentric channels 88 that are connected through a radially extending channel 89 to a gas supply tube 90. Hypodermic-type needles 91 project beyond the discharge half of the plate and extend into the channels 88 and are thus supplied with gas. Thus the gas that is supplied to the tube 90 will pass through the channels 88 and 89 and be discharged from the needles 91. The needles 91 are located in between openings 92 in the plate 87 and form a honeycomb-like structure in the material passing through the plate and around the needles.

In this embodiment, a series of feed blades 93 of a feed head 94 are attached to extrusion worm 1$^a$ by pins 95 and driven thereby. The feed blades 93 are pitched so as to press the material delivered by the worm through the openings 92 in the plates 87 and around honeycombing needles 91 and then out of discharge nozzle 74. The blades 93 are designed according to the plasticity of material being extruded so that the feed rate through the plates 87 caused by the action of blades 93 will correspond to the rate of through-put from the worm without developing destructive pressures on the plates 87 yet providing sufficient pressure in the constricted barrel section 72 to get a proper integration of the honeycombed mass being extruded. This may be obtained by using the proper pitch, number of blades and depth of blade for the feed blades 93. The gas pressure and supply to the channels 88 and needles 91 and its effect will depend also on materials and results desired. The gas supplied will control the degree of the collapse of the track left by needles and may be regulated to leave a very fine track or tunnel that is much smaller than the size of the needles themselves. This honeycombed cross-section of the barrel decreases as the barrel converges so that in the throat 74 the tunnels are very closely aligned.

An air-tight packing gland 96 is provided for the shaft 6ᵃ driving the worm 1ᵃ. The gland 96 and the sealed bearing 54 in which the sleeve 53 is supported are designed to contain the gas pressure within the chamber 19 that is required for the specific plasticity of the material being processed. The gas is blocked from escape from the chamber 19 by the seal developed at discharge end of first worm 1 by the compressed material being processed and in second stage by the material that is being compacted and extruded by the second worm 1ᵃ. A speed control device (not shown) may be used to control the driving rate of the worm 1 through the gear 7. Such a variable speed control may be regulated by measuring the work or kilowatts being consumed for any given rate of through-put so that the speed of worm 1 will be raised or lowered as required to obtain a sufficient feed to insure a uniform through-put rate for any given application, and this also correlates the main feed rate to the rate of feed of the secondary material being introduced and metered at 20.

For handling delicate materials which should not be accumulated around the feed head 55 in the chamber 18, the feed barrel 2 of the plodder may be placed in a vertical position with the second stage of the plodder positioned horizontally beneath the first stage. In such an arrangement gravity assists in feeding the material cut by the edges 62 of the blades 59 to the spreading edges 63 and prevents any undue accumulation of such material in the chamber 18.

The apparatus just described may also be operated to deaerate the material being treated. This may be accomplished by shutting the valve 14ᵃ in the line to the channel 15 in the worm 1 in the shaft 6 and connecting the chamber 18, and the chamber 19, to a vacuum pump rather than to a supply of gas under pressure. In such a case the secondary feed blade 27 may continue to be used to supply a secondary material or it may be shut off or connected to a vacuum pump. Under these conditions particles of air or other gas that are present in the material being treated are released by the comminuting and spreading of the material in the various stages and as the air or gas is released, it is drawn off by the vacuum created by the pump.

The operation of the apparatus and the process will now be described as applied to the aerating of a milled toilet soap material as a specific example. It will be understood that the terms "aeration" and "deaeration" as used herein are intended to include the use of suitable gases other than air and these terms have been used merely for convenience of expression.

Milled toilet soap as prepared in the customary manner has a micro-crystalline structure that is easily reverted to its original coarse-crystalline unmilled state under temperature or pressure changes such as occur when ingredients are beaten or mixed into the milled soap instead of being cut in. In accordance with the present invention ribbons of milled soap stock are fed through the opening 3 in the plodder onto the worm 1 where they are compacted by the action of the worm into a solid soap mass. As this soap mass is fed forward by the worm, it reaches the comminuting head 39. Upon reaching the comminuting head 39 the comminuting blades 41 shred the mass into finely divided portions and at the same time press these portions through the foraminous plate 43. As the blades 41 shred and spread the soap stock on the plate 43, air or other suitable gas is introduced through the orifices 42 in the blades 41 and this gas is entrapped in the flowing soap stock under the influence of the blades and small bubbles or globules of gas are entrained in the shreds of soap stock as they are being pressed through the openings in the plate 43. Gas is also introduced at the trailing edge of the blades 41 so as to distribute the gas more evenly throughout the soap mass. In order to obtain a uniformly textured soap, the plate 43 should have approximately 300 to 400 openings per square inch and should be of about 18 gauge material.

The extruded and coarsely aerated shreds of soap upon passing through the openings in the plate 43 enter the converging operations 59 in the pressure plate 48, wherein a bundle of relatively fine strings of the soap stock are compacted into larger ropes of aerated stock. As the larger ropes of aerated stock emerge from the openings 59 in the pressure plate 48, they are cut into pellets by the leading edges 62 of the cutting and spreading blades 58 of the independently driven cutting-spreading and feed head 55 that operates in the chamber 18. Since the mass of the soap stock is withheld from the chamber 18 by the plates 43 and 48, the blades of the cutting-spreading and feed head are working on only a small portion of the mass at any given time and function by a cutting or laying in technique rather than by the beating or mixing of the mass of soap stock as a whole.

As the pellets of soap stock are cut off in the chamber 18 by the blades 58, they are spread on the surface of the foraminous plate 38, which has openings several times larger than plate 43, and are pressed through the openings in the plate by the trailing or spreading edges 63 of the blades 58. The cutting-spreading and feed head may be driven at any desired speed and a rapid wiping and spreading action is obtained so that the trailing edges 63 of the spring tensioned blades 58 tend to break up any large gas globules that were incorporated in the stock during comminution. This forms finer gas bubbles in the stock without any working of the mass of the stock which is held back by plates 43 and 48.

The chamber 18 is maintained under sufficient gas pressure to prevent deaeration of the pellets and the advancing stock as it is spread on the plate 38. Any gas pressure above that required to prevent such deaeration will produce a secondary aeration that will take place during the spreading action in chamber 18. The pressure in chamber 18 also assists in forcing the stock through the openings in the plate 38.

A secondary material or ingredient such as perfume, coloring matter, face cream or the like may be supplied as previously described by the feed blades 27 in minute and metered amounts to the stock as it is being spread on the plate 38. By this arrangement the secondary material is incorporated in the stock in finely divided and uniformly distributed form also without working or beating of the mass of the material as a whole and the secondary material may actually be stratified between layers of the soap stock.

The speed of rotation of the cutting-spreading and feed head 55 is controlled to obtain the desired gas and perfume distribution without developing an undesirable temperature rise. By incorporating the perfume or other secondary material in the soap stock in evenly distributed and finely divided form the smallest quantity necessary to produce the desired results may be used and it will not cause difficulty in later integration of the soap mass.

The openings in the plate 38 are designed to produce the desired structure in the soap stock. As the aerated and perfumed stock advances, it passes through the non-converging openings 65 in the pressure plate 64. The cutting wire 68 of the independently driven cutting head 56 cuts the streams of stock emerging from the openings in the plate 64 into aerated and perfumed pellets without disturbing the state or crystalline structure of the stock materially.

The aerated and perfumed pellets of stock then drop by gravity through the pressurized chamber 19 onto the extrusion worm 1ª of a second stage of the plodder. The pressure in the chamber 19 is held at a value sufficient to retain the aeration of the pellets in the chamber and to prevent migration of the gas cells already formed, under the mechanical pressure of the worm 1ª in further compacting and extruding of the stock. The finer the distribution of the gas cells and the harder the soap base the less gas pressure is needed to prevent this migration.

When the aerated soap, which is still held under the desired pressure, enters the final plodding stage, it is gradually compressed by the worm 1ª which is shaped to compress the soap sufficiently so that when the mass reaches the exit end it will be well compacted and extruded as a homogeneous stream which is free from cracks or unwelded striations. It will be found that aerated milled soap integrates much better than deaerated stock. The soap then has a structure and consistency that retains the exceedingly fine particles of uniformly distributed gas, even though a certain amount of expansion takes place as the soap stream leaves the orifice plate 75.

Certain variations may be made in the above process if desired. For example, where soap chips have been prepared so as to entrain gas with them as the chips are loosely fed to the plodder, additional aerating gas, if needed, may be entirely supplied to the material in the chamber 18 rather than through the blades of the comminuting head 39, thus using the chamber 18 simply as a blending stage to get better and finer distribution of the gas bubbles that are already present by entrainment or supplied through inlet tube 17.

Transparent soap bases may also be aerated in accordance with the present invention without altering their ultramicroscopic crystalline structure. For example, a soap base in what is commonly called the transparent phase may be prepared by adding retarding materials, such as glycerol, alcohol, sugar, resin soap, castor oil soap, etc., to ordinary melted fat soap bases, which control solidification so as to produce ultra-microscopic crystallites, too small to provide optical discontinuities. Soap chips of this specially solidified soap in the ultra-micro-crystalline phase can be fed to the plodder and aerated as described above. The ultra-micro-crystalline state in soap also can be produced by subjecting the soap chips without the retarders listed above to excessive roll pressures, in the absence of shear, without materially heating the soap chips above room temperatures, as taught in Patent Numbers 2,374,046 and 2,374,047, and the resulting soap chips may then be extruded and aerated according to the present invention without materially altering their crystalline state.

By the aeration of such so-called ultra-microcrystalline soap bases, a much improved lathering property is obtained that offsets the adulterating effect of the retarders, if used. In processing such a soap base the openings in plates 43 and 48 are made larger so as to lessen the compacting pressures in the barrel 2, and to prevent the churning of this usually softer soap base. Gas distribution at the comminuting head 39 will thus be rendered less satisfactory so that aeration is preferably accomplished entirely in chamber 18 by the controlled speed of the cutting-spreading and feed head 55, and proper adjustment of gas pressure and supply in the chamber 18 through the inlet 17 and/or the feed blade 27.

While such aerated soap base loses its transparency, it retains all the other desirable qualities of the ultra-micro-crystalline state, such as rubbery durability and pliability, adaptability to stamping deformation, and freedom of finished bar surface from dusting. Also, an adulterated formula may be used for a floating bath soap that will give good lathering without waste. Such soaps integrate very well in the plodder and yield bars which never crack in use.

As previously mentioned, a deaerated soap may be produced in accordance with the present invention from milled or transparent soap bases without altering the crystalline structure of the material, by placing chambers 18 and 19 under vacuum instead of pressure, and using the cutting-spreading head 55 to break down and release any bubbles of gas that are present in the mass of the material in order to obtain complete deaeration.

In the process that may be practiced under present invention to deaerate and extrude a soap base in the ultra-micro-crystalline phase of transparent soaps, a harder base chip such as those prepared by special repeated or high pressure, non-shearing, low-temperature milling should be used so as to overcome the tendency of softer bases to churn under extrusion pressures.

An fine comminuting plate 43 is used and chambers 18 and 19 are exhausted by vacuum pumps (not shown) being connected to inlet tubes 17 and 17ª. The stock cut off by blades 59 of the cutting-spreading head 55 will be in the form of loosely compacted shreds and therefore will release some of the present or entrained gas bubbles in the stock and the spreading action of blades 58 as they spread the stock over the plate 38 causes the smallest globules of air or gas to be mechanically broken down so as to be released and exhausted. The independent drive for head 55 permits its speed to be regulated so that a thorough deareation of each film of stock that is spread on plate 38 is secured. This permits the effective deareation of heavy plasticized materials of all sorts.

In the extrusion of a deareated soap base in the transparent phase, certain little-understood phenomena may work against gaining clear transparency in the extruded bar; however, a very unique product in translucent appearance and texture is obtained, representing the ultimate degree of refinement of the so-called hard-milling techniques in soaps where the finest possible crystalline or amorphous structure is sought.

If it is desirable or necessary in any of the above processes the plates 48 and 64 may be of the type that are divided and provided with cooling tubes 86 so as to dissipate any heat generated by the heads 39 and 55 in order to prevent reversion of the crystal state of the stock being processed.

Both the aerated and deaerated ultra-microcrystalline soap bases are important soap structures for use in making special bars with inserts or inlays or bars made of many laminations on which special markings or imprints are made to endure throughout the washing down of the bar in use. Such a soap base, as shown in Patent Number 2,613,185 will weld together at the various joints just by the action of water in ordinary use. This welding or knitting effect cannot be produced using ordinary milled soap bases because of the larger crystals in such soaps.

In processing doughs for bread or pastry the steps are similar to those just described except that in such an application a plasticized shortening may be supplied and spread by blade 27 and the openings in plates 38 and 64 may be varied according to the type of dough being processed as well as openings in plates 43 and 48. The size of gas cells in the dough as well as the nature of stratification of the shortening is all under the influence of size and shape of openings in plates 38 and 64, the speed of head 55, and the pressure in chambers 18 and 19. The dough layer formations in openings of plates 38 and 64 may be actually moved ahead by the gas pressure alone in chamber 18 between the wiping actions of blades 58, so as to create a bubble of gas between each spread or layer put down by the blade 58.

The use of the split plates 78 and 79, as shown in Fig. 11, provides a means for developing a cellular structure by alternately compacting and releasing the material stratified in the orifices 80. This also creates a seal between chambers 18 and 19 so that these chambers may be maintained at different gas pressures if desired. The wire cut-off feature of head 55 is of particular importance in dough and candy work as the clean cut made by the wire prevents the formation of lumps and untrue structures such as would be caused by the smearing of an ordinary cutting blade.

In order that a dough retain its aeration in virtually the same degree and without any material break-down of the cell walls until completely baked, the dough must be stiff enough and elastic enough to withstand handling as it is being placed into an oven and to withstand the expansion of the gas in the cells during the initial heating period in the oven. The present process provides a means of aerating doughs of such stiffness and elasticity.

Furthermore, the cutting in of cold shortening into bread or pastry doughs in accordance with the present process is different from other mixing techniques which do not maintain the segregation of these materials until baking is done.

The pitches of worms 1 and 1ᵃ may differ somewhat depending upon the plasticity of material being processed and the differences in the character of the material as it proceeds through the various stages such as changes in volume.

In accordance with the present invention, materials such as thermosetting plastics or cement and clay bricks and tiles may be extruded in the form of an aerated cellular structure and yet the material may be processed in a stiff enough state so that it will retain its form and shape after extrusion in order to withstand the setting-up steps that follow; i. e., thermo-setting or firing. The pressures developed both internally and externally during extrusion can be made sufficient to obtain a strong cellular structure in the webs which separate the cells, and extremely fine cells can be developed by increasing the speed of the spreading blades.

As shown in Fig. 16, more than one feed blade 27 may be assembled on head 55 to supply one or more additional ingredients in controlled sequence to the material being processed. The feed blades 27 may be positioned with one or more of the spreading blades located between them and the thickness of the layers of the various materials and their position may be controlled by appropriately positioning the feed blades. In this arrangement pipes 23ᵃ connect channels 26ᵃ in the shaft 25ᵃ through a dual channelled revolvable packing gland 96 to supplies of the respective materials. The channels 26ᵃ in the shaft 25ᵃ are in turn connected through channels 31ᵃ to separate blades 27ᵃ carried on the hub 29ᵃ of the head 55. Also a cleaning blade designed to scrape plate 38 at right angles may, if desired, be added to the head 55 in the manner illustrated by the alternate blades 41 of head 39 as shown in Fig. 4.

This process and apparatus has many applications other than those noted; however, the basic principle is one of moving a heavy plasticized mass of material to a comminution zone wherein the advancing end of the mass is comminuted and reduced to shreds with or without the introduction of gas. This comminuted material after being loosely compacted is then sliced or cut off and wiped or spread in thin layers over the surface of a spreading plate, with especially designed openings in it that determine the nature of cell cross-section being formed. This slicing, wiping and blending action is carried out under conditions where it is entirely separate and free from the mass of through-put material and the pressure of through-put stock is being withheld so that no appreciable working of the main mass of material takes place and dissemination of a secondary material is accomplished by stratification rather than by mixing or beating of the mass as a whole.

The layers or strata of specific materials, including gas bubbles which may be occluded, are wiped into the openings in the spreading plate in a predetermined order and are advanced either by wiping or by gas pressure, or both. This aerated, stratified or cellular material may then be compacted if desired either by momentary stoppage, or by the proper tapering of the openings from which it emerges.

The cellular and/or stratified material is then cut off into pellets which are gradually compacted into an integral mass in second plodder stage under gas pressure to prevent migration of the occluded gas bubbles and which may assist the extrusion, thus the structure remains uniform during extrusion although subject to high mechanical and gas pressures. A plasticity is chosen to gain the retention of form required after discharge from a sizing orifice, and very stiff materials can be handled by this process with a minimum of heat generating work being performed on such material because a cutting and spreading technique is employed rather than a mixing or beating of the mass of the material as a whole.

This process may also be adapted to the reconstitution of materials from previously separated ingredients such as the blending of butters from congealed butter-fat. In such an adaptation, the congealed oil or fat extracted from butter would be blended with the required water, salts, flavor, color and/or gas to simulate the churned product. Such a process could be carried out continuously and the shaping and cutting of the cake of finished butter as it is extruded could be fully mechanized. This would enable the trade to ship the congealed fat or oil in an unrefrigerated state and separate from the hydrolizing salts and water which hasten rancidity and require refrigeration of the churned butter.

Cellular building materials in sheet or special bar shapes can be extruded at pressures sufficient to get a reasonable strength in the material when finally set, as well as good insulating properties.

An important element in the process is the precise control that may be maintained over the feed of secondary ingredients even under sticky and fouling conditions. For special processes the modified forms of the metering orifices in the feed blade 27, such as shown in Figs. 17 and 18, may be used. With a high positive pressure in manifold passage or space 31a, the metering pin may be made to fit the orifice opening 35 closely and the orifice may be provided with a series of minute internal rings 97 as shown in Fig. 17, that give the orifice the construction of a minute labyrinth seal in which the pressure differential lessens at each ring. With such a close fit and labyrinth construction, the pin 33 in reciprocating will carry the secondary material, which is under pressure in manifold 31a, through the orifice 35 by a physical pumping action, or an action based on moving the material adhering to the pin forward and out, as the pressure in the manifold recoats the pin on its return travel and the recoated material forces the forward flow of material during forward reciprocating action of pin 33 in respect to orifice plug 32.

Another modification of the feed is illustrated in Fig. 18 and comprises a simple glandless metering plunger pump type applicator for dispensing and valving small quantities of flowable material. In this form of the feed, ball check valves 100 shut off the outlet orifices ports 101 by closing the passageways 102 leading to the channel in which the metering pin 33 reciprocates.

These arrangements for obtaining a non-clogging positive and metered feed of a material may be used wherever a metered or pressure feed is desired, as for example in fountain pens, paint or glue applicators or the like. In such applications, the feed may consist of a single cell mounted on a support, such as the boss 34 and the flexing of the unit developed by application of bending pressure applied to its tip that will correspond to the edge 37 of the blade 27.

Extrusion of candy bars can be accomplished by this process to obtain stratified structures of two or three different candy bases, together with aeration, thus obtaining new eating qualities. The deaeration of tooth pastes or shampoo creams or face creams, as well as providing a closed system for the final non-mixing addition of volatile perfumes at low temperatures, is another type of operation for which this process is suited.

The new products resulting from this process in soap, baking, candy, chemical or structural material fields, are many, but each is typified by the special properties present in the following examples:

An aerated extruded ultra-micro-crystalline soap, made in accordance with the process as described wherein the primary material consists of soap chips of a base containing so-called retarder adulterants, has a structure of minute and uniformly-distributed gas cells incorporated in the colloidal suspension of soap crystallites and liquid or semi-solid retarder adulterants, without upsetting this suspension or modifying the crystallization previously obtained by the slow solidification of the transparent soap base.

The preservation of this physical state depends upon the absence of temperature rise in the process, and the presence of gas pressure to counterbalance the effects of mechanical pressures developed in the extrusion treatment. Such a soap is distinguished by its intensely compacted and well integrated structure from an aerated ultra-microcrystalline soap that has been cast, without extrusion. The longitudinal grain of the soap resulting from the present technique can be revealed by twisting and untwisting by hand a freshly extruded piece. Such a soap typifies the extrusion of colloidal suspensions without separation or material alternation of crystal structures.

Another product that may be obtained is the de-aerated extruded ultra-micro-crystalline soap made from chips of a base which has not been adulterated by retarders but which was reduced to the transparent crystallite state by excessive controlled-temperature milling. This product has a dense structure from which the air that is present or is unavoidably entrained with the chips has been removed, and a unique translucency is obtained because of the minute size of the crystallites, making up its structure. Evidence of its plasticity and high pressure integration during extrusion, as well as its longitudinal grain, is found by distortion of a freshly extruded piece, as well as by measuring the little, if any, change in density before and after stamping of the extruded blank. Such a soap typifies an extruded product from which the entrained gas has been removed without materially upsetting a prepared crystalline state.

Another that may be obtained is an aerated and stratified bread dough that is produced by introducing as a primary material in the process a properly glutinized dough, without the need for the usual gas-generating ingredient, such as yeast or baking powder, and in which at least a portion of the shortening is laid in or stratified between layers of dough, as it was processed to a spongy cellular state; has a taste, texture and eating quality distinguishable from conventional bakery products. Such a product typifies the result of controlled aeration and secondary ingredient stratifications without devitalization by over working of the primary material, together with form retention during the setting, or in this case, the baking stage.

While certain embodiments of the invention have been illsutrated and described in detail herein, it will be understood that various modifications and changes that may be made by those skilled in the art without departing from the scope of the invention as defined by the appended claims.

I claim:

1. A method of aerating plasticizable material, which comprises: placing the material in an enclosure having a restricted outlet; exerting pressure upon the material in the enclosure to thereby compact the same into a deformable solid mass and force the same from the enclosure through its restricted outlet; comminuting the compacted material leaving the enclosure while supplying a gas thereto so as to effect aeration of the material; and integrating the comminuted aerated material a little at a time and in a zone removed from the influence of the compacting pressure on the material, into a thin sheet to thereby effect blending and homogenzation of the material and fine dispersion of the gas in the material.

2. The method set forth in claim 3 further characterized by the addition of a fluid secondary ingredient to said material as it is undergoing blending and homogenization to cause said secondary material to be combined and thoroughly blended with the material during homogenization.

3. A method of continuously blending and homogenizing a plasticizable base material prior to extrusion thereof through a restricted orifice, which comprises: exerting pressure upon the base material in an enclosure having a restricted outlet to thereby compact the material and force it from the enclosure as a deformable solid; feeding the thus compacted material into a comminuting zone; comminuting the material in said zone; feeding the comminuted material into a homogenizing zone; passing the comminuted material through said homogenizing zone at a rate faster than it is fed thereto, and while in said zone blending and homogenizing the comminuted material by integrating the same into a homogeneous thin sheet having a volume considerably less than that of the homogenizing zone; discharging the thus integrated material from the homogenizing zone in the form of a multiplicity of strands of small cross section; and recompacting the strands of integrated material preparatory to extrusion of the material through said restricted orifice.

4. The method set forth in claim 3 further characterized by: forming a multiplicity of needle-like tracks in the material immediately prior to extrusion of the material through said restricted orifice, while simultaneously injecting a gas into said tracks, whereby a pressure and shear integrated honeycombed material issues from said restricted orifice.

5. An apparatus for aerating a plasticizable material, comprising: a plodder having a barrel and a worm rotatable therein, for compacting the plasticizable material and for feeding it under pressure toward a discharge opening at one end of the plodder barrel; a hollow end piece secured over the discharge end of the plodder barrel with its interior in communication with the interior of the barrel; a comminuting head inside said end piece including a foraminous plate disposed crosswise of the discharge opening of the plodder barrel; means for supplying air at above the compacting pressure to said comminuting head for entrainment of particles of such air in the material during comminution thereof; means defining a homogenizing chamber inside said end piece communicated with said comminuting head and in which the aerated comminuted material is received; means in said homogenizing chamber for effecting fine division and dispersion of said air particles throughout the mass of material in said chamber including rotatable spreading means, and an apertured plate upon which the aerated comminuted material is spread by said spreading means to be forced through the holes in said apertured plate by the spreading means; means for driving said rotatable spreading means independently of said worm; rotatable cutter means inside said end piece and adjacent to the side of said apertured plate remote from the spreading means for cutting the material passing through said plate; means for driving said cutter means independently of said worm and spreading means; means connected with said end piece with an air-tight seal for receiving the cut material, said last named means including compacting and extruding means; and means on said end piece providing a port connectable with a source of gas at above compacting pressure to enable the interior of the end piece to be maintained at a pressure sufficiently high as to prevent migration of the air cells in said plasticizable material despite the compacting and extruding pressures exerted thereon.

6. The apparatus set forth in claim 5 further characterized by the provision of a hollow feed blade carried by said spreader means and having a series of small orifices therein opening to said homogenizing chamber; and duct means extending through said end piece and communicated with the interior of said feed blade to provide for the supply of an additional ingredient to the comminuted material as it is spread on said apertured plate.

7. An apparatus of the character described, comprising: a plodder including a rotatable worm and a barrel in which the worm rotates to compact plasticizable material fed into the barrel and to advance said compacted material toward a coaxial outlet at one end of the barrel; an annular extension on the barrel at the outlet end thereof, and coaxial with the barrel; a hollow end piece carried by said extension, at the outer end thereof, with its hollow interior aligning with the plodder barrel; a drive shaft projecting through said end piece and into said extension; means supporting said shaft for rotation coaxially with but independently of said worm, including perforate bearing means fixed inside said extension and extending across the outlet of the barrel; wiper blades carried by said worm to rotate therewith; an apertured comminuting plate fixed inside the extension, in a position normal to the axis of the worm, and against which said wiper blades act to force compacted material issuing from the barrel through the apertures of said plate upon rotation of the worm to thereby effect comminution of said compacted material; a foraminous spreading plate fixedly mounted inside said extension in a position normal to the axis of said drive shaft and a distance outwardly of said comminuting plate, and through which the comminuted material must pass before discharge thereof into the interior of said end piece; wiper blades fixed on said shaft and arranged to wipe across the inner face of said spreading plate to spread the comminuted material thereacross and force said material through the plate upon rotation of the shaft; and compacting means communicated with the interior of said end piece to receive the material forced through said spreading plate, to further compact the same, said compacting means having a restricted extrusion orifice therein through which the material is discharged from the apparatus.

8. In an apparatus for aerating a plasticizable material such as soap: a plodder including a barrel having an inlet at one end and a coaxial outlet at its other end, and a worm rotatable in said barrel to progressively compact the plasticizable material fed into said inlet and advance the same forwardly toward the outlet of the barrel; an end structure secured over said outlet end of the barrel including a hollow end piece, and a sleeve-like element interposed between said end piece and the barrel, coaxially thereof, to provide in effect a forward extension of the barrel; axially spaced foraminous plates fixed in said extension and extending crosswise of its interior with the innermost plate spaced from the adjacent end of the plodder barrel; wiper blades rotatable inside said extension in the space behind said innermost plate and operable upon the side thereof facing the barrel; a rotation transmitting connection between the worm and said wiper blades whereby the latter rotate with the worm to wipe compacted material issuing from the barrel across said side of the innermost plate and force the material through the apertures therein and into the space between said plates; duct means leading into said space behind the rearmost plate for supplying air thereto at a pressure above that developed in the plodder to effect aeration of the material being acted upon by said wiper blades; spreader blades rotatable inside said extension in the space between the plates and operable to wipe across the adjacent face of the foremost plate so as to spread the aerated material in a thin layer thereon and force said material through said foremost plate to thereby effect fine division and dispersion of the air throughout the mass of the material passing through said space between the plates; and drive means extending through said end piece and connected with said spreader blades for rotating the same independently of said wiper blades.

9. The apparatus set forth in claim 8 further characterized by the provision of cutting edges on said spreader blades arranged to sweep across the adjacent side of said innermost plate for cutting the material entering the space between the plates into pellets.

10. The apparatus set forth in claim 8 further characterized by the provision of duct means leading through said extension and communicating with said space between the plates for supplying air to said space at a pressure sufficiently high as to preclude escape of air particles entrained in the material during spreading thereof over said foremost plate.

11. The apparatus set forth in claim 8 further characterized by the provision of spring means acting on said spreader blades through said drive means for yieldingly urging the spreader blades against the adjacent face of said foremost plate.

12. The apparatus set forth in claim 11 wherein said spreader blades are yieldable.

13. Soap processing apparatus comprising the combination of: a pair of worm type plodders each having an inlet and an outlet; duct means communicating the outlet of one plodder with the inlet of the other to connect the same in series, said duct means having a portion thereof provided with a bore coaxial with the barrel of the first plodder; axially spaced first and second foraminous homogenizing plates fixed in said bore, crosswise thereof, through which soap compacted in the first plodder must pass successively to reach the inlet of the second plodder for final integration and homogenizing therein; a first set of wiper blades in said bore constrained to rotate on the axis thereof with the blades in engagement with the upstream side of the first plate; a rotation transmitting connection between said wiper blades and the worm of the first plodder whereby compacted soap approaching said first plate is spread across the upstream face thereof and forced through its apertures by the wiper blades to exert a homogenizing action on the soap; means including said wiper blades for introducing air into said bore adjacent to the upstream face of said first plate for entrainment of such air in the soap by the action of the wiper blades on the soap; a second set of wiper blades confined in the space between the plates and rotatable on the axis of said bore to wipe across the upstream side of the second plate for spreading the aerated material thereacross and for forcing the material through the apertures of said second plate, said second set of blades effecting further homogenization of the soap and fine division and dispersion of the entrained air throughout the mass of the soap acted upon in said space; an air line leading into said space between the plates and connectable with a source of air at substantial pressure to enable said space to be maintained at a pressure high enough to prevent escape of the occluded air from the aerated soap; cutting means rotatable in said bore adjacent to the downstream side of said second plate for cutting off the strands of soap which issue from the apertures of said second plate so that the soap entering the inlet of the second plodder is in pellet form; and drive means extending through the duct means into said bore, and connected with the second set of wiper blades and the cutting means to rotate the same independently of the worm and the first set of wiper blades driven thereby.

14. The method of continuously processing cold milled soap to aerate the same, which comprises: progressively compacting the soap into a deformable mass; feeding the compacted deformable soap mass through a comminuting zone where it is broken up and into a blending zone; continuously spreading the soap in the blending zone over a foraminous plate to form the soap into a thin film and to force it through the apertures in the plate to thereby effect occlusion and uniform distribution in the soap of gas present in the blending zone; and so controlling the rate of feed of the soap mass through the comminuting zone and the speed of the spreading action within the blending zone that the soap moves through the blending zone much faster than it moves through the comminuting zone.

15. The method set forth in claim 14 but further characterized by the step of positively introducing a fluid secondary ingredient into the soap as it is being spread upon the foraminous plate to cause said secondary material to be combined and thoroughly blended with the soap.

16. The method set forth in claim 14 but further characterized by the additional step of turbulating the soap as it is spread over the foraminous plate.

17. The method set forth in claim 14 but further characterized by the fact that the entire process is conducted with the soap in solidified state and at a less-than-crystal reversion temperature.

18. A process for aerating milled soap, comprising the steps of: continuously compacting unheated milled soap chips and progressively feeding said compacted soap chips forward; shredding and aerating the soap by forcing the compacted soap through openings in a foraminous plate extending across the direction of flow of said soap and forcing particles of gas with the soap through said openings whereby the particles of gas are enveloped by said soap to form aerated shreds of said soap; maintaining gas pressure on the gas containing soap shreds leaving said plate to retain occluded gas; forming the shreds into compacted pellets; mechanically spreading the pellets over the surface of a foraminous plate at a fast enough rate of speed to preclude the accumulation of pellets on the plate so that the soap is rapidly forced through the apertures in the plate and no more than a thin film of soap is allowed to accumulate thereon whereby the gas bubbles occluded in the soap are broken down and uniformly distributed throughout the mass of the soap; recompacting the finely aerated soap under conditions which prevent de-aeration of the soap; and extruding the recompacted soap mass as a bar of soap that will float.

19. In the method of processing plasticizable material to incorporate a fluid secondary ingredient therein, the characterizing steps of: compacting the material into a deformable mass and feeding the mass under pressure and at a predetermined rate toward a blending zone; breaking up the mass into discrete pieces at the inlet of the blending zone; feeding the fluid secondary ingredient into the blending zone; and moving the material through the blending zone at a rate considerably faster than said predetermined rate at which the material moves toward the blending zone by rapidly crushing and spreading the discrete pieces over a foraminous plate to form the material into a thin film and blend the secondary ingredient into it, and at the same time progressively discharge the manipulated material from the blending zone through the apertures in the plate.

20. A method of aerating milled soap which comprises the steps of: compacting the soap into a deformable integrated mass; separating small amounts of the soap from said compacted mass and conducting them into an air chamber spaced from the mass and having a volume considerably greater than the total volume of the separated amounts delivered to said chamber; crushing and spreading the material in said chamber over a foraminous plate to form the same into a thin film and effect occlusion and uniform dispersion of air in said film; and discharging the manipulated material from the blending zone through the apertures in the foraminous plate.

21. In the method of processing plasticizable material to incorporate a fluid secondary ingredient therein, the steps of: compacting the material into a deformable integrated mass; separating small amounts of the material from the mass and conducting them into a blending zone spaced from the mass and having a volume considerably greater than the total volume of said separated amounts of material in said zone; feeding the fluid secondary ingredient into said zone; and manipulating the material in said zone to incorporate the fluid secondary ingredient therein by spreading the material along with the fluid secondary ingredient over a surface to form the same into a thin film on said surface; and by said spreading discharging the material comprising said film from the blending zone.

22. In the method of processing plasticizable material to incorporate a fluid secondary ingredient therein, the steps of: compacting the material into a deformable integrated mass; separating small amounts of the material from the compacted mass and conducting them into a blending zone spaced from the mass and having a volume considerably greater than the total volume of the separated amounts in the zone and having a restricted outlet; feeding the fluid secondary ingredient into the blending zone; manipulating the material in the blending zone to blend the fluid secondary ingredient into it by spreading the material along with the fluid secondary ingredient over a surface to form the same into a thin film on said surface; and by said spreading, moving the manipulated material comprising the film toward and through the restricted outlet leading from the blending zone.

23. An apparatus for processing plasticizable material to incorporate a fluid secondary ingredient therein, comprising: means defining a blending chamber having an inlet and an outlet and through which the material to be processed must pass; a foraminous plate fixed across the outlet so that material to be discharged from the chamber must flow through the apertures in said plate; means for compacting the material into a flowable mass and for moving it toward the inlet of said chamber; a foraminous plate fixed across the inlet of said chamber and through which the material is forced by the compacting pressure; means for feeding the fluid secondary ingredient into said chamber; means for breaking up the material entering the blending chamber into small pellets; and means for spreading said pellets as they are formed over the foraminous outlet plate to form the same into a thin film with the fluid secondary ingredient uniformly dispersed therein and discharge the manipulated material from the blending chamber through the apertures in said outlet plate.

24. The structure set forth in claim 23 further characterized by the fact that the surface of the foraminous outlet plate upon which the material is spread has means thereon defining spaced ridges so that the spreading means in passing thereover effects a turbulence of the material as it is spread over the plate.

25. Apparatus for extruding plasticizable material in a manner to impart a honey-combed structure to the material, which comprises: a converging discharge nozzle; a foraminous plate across the large inlet end of the nozzle, said foraminous plate having air passages therein around its apertures and having an air inlet opening communicating with said passages; a multiplicity of hollow needles mounted on and projecting from the downstream side of the foraminous plate, said needles communicating with the inlet passages in the plate so that air supplied to the inlet passages may be forced into the material as it enters the discharge nozzle through the apertures in the plate; means for feeding material to the upstream side of the foraminous plate; and pitched feed blades mounted to revolve across and have wiping contact with the upstream side of the foraminous plate to force the material through the apertures therein.

26. Apparatus for aerating plasticizable material, comprising: a plodder having a barrel and a worm rotatable therein for compacting the plasticizable material and for feeding it under pressure toward a discharge opening at one end of the plodder barrel; a foraminous plate secured across the discharge end of the plodder barrel, said plate having a plurality of air passages therein; means for introducing a gas under pressure into said passages; a multiplicity of hollow needles mounted on and projecting from the downstream side of the foraminous plate with their interiors in open communication with said air passages so that a gas under pressure may be injected from the needles into the material issuing from the apertures in the foraminous plate; a constricted nozzle mounted over the downstream side of the foraminous plate and into which the material discharged therefrom is forced; and feed blades mounted to revolve with the worm of the plodder and to wipe across the upstream side of the foraminous plate, said blades being pitched to force the material through the apertures therein.

DONALD E. MARSHALL.

References Cited in the file of this patent

UNITED STATES PATENTS

| Number | Name | Date |
|---|---|---|
| 1,355,731 | Bloch | Oct. 12, 1920 |
| 1,446,189 | Laskey | Feb. 20, 1923 |
| 1,651,242 | Baker | Nov. 29, 1927 |
| 2,132,690 | Hilliard | Oct. 11, 1938 |
| 2,197,919 | Bowman | Apr. 23, 1940 |
| 2,240,841 | Flynn | May 6, 1941 |
| 2,291,212 | Clinefelter | July 28, 1942 |
| 2,298,644 | Hummel | Oct. 13, 1942 |
| 2,358,976 | Houlton | Sept. 26, 1944 |
| 2,377,069 | Brubaker | May 29, 1945 |
| 2,412,979 | Garvey | Dec. 24, 1946 |
| 2,494,891 | Marshall | Jan. 17, 1950 |
| 2,524,999 | Schulerud | Oct. 10, 1950 |

FOREIGN PATENTS

| Number | Country | Date |
|---|---|---|
| 46,102 | Denmark | Aug. 5, 1931 |